United States Patent
Fugetsu

(10) Patent No.: US 8,486,362 B2
(45) Date of Patent: Jul. 16, 2013

(54) REDISPERSIBLE AGGLOMERATE OF FINE CARBON FIBERS AND METHOD FOR PRODUCING THEREOF

(75) Inventor: Bunshi Fugetsu, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 224 days.

(21) Appl. No.: 12/598,624

(22) PCT Filed: May 1, 2008

(86) PCT No.: PCT/JP2008/058393
§ 371 (c)(1),
(2), (4) Date: Apr. 5, 2010

(87) PCT Pub. No.: WO2008/139963
PCT Pub. Date: Nov. 20, 2008

(65) Prior Publication Data
US 2010/0329966 A1    Dec. 30, 2010

(30) Foreign Application Priority Data
May 7, 2007    (JP) .................................. 2007-122830

(51) Int. Cl.
*D01F 9/12* (2006.01)
(52) U.S. Cl.
USPC ........................................ 423/447.1; 977/742
(58) Field of Classification Search
USPC ................. 423/447.1, 447.3, 445 B; 977/742
See application file for complete search history.

(56) References Cited

U.S. PATENT DOCUMENTS
6,723,299 B1    4/2004    Chen et al.
2003/0012951 A1    1/2003    Clarke et al.
(Continued)

FOREIGN PATENT DOCUMENTS
EP    1788146 A1    5/2007
JP    2004-256964 A    9/2004
(Continued)

OTHER PUBLICATIONS

Material Safety Data Sheet—CTAB. <http://spinner.cofc.edu/grice/pdf/MSDS/Rm209/CTAB.pdf> Accessed Dec. 1, 2011. Feb. 18, 1999.*

(Continued)

*Primary Examiner* — Daniel C McCracken
*Assistant Examiner* — Richard M Rump
(74) *Attorney, Agent, or Firm* — Sughrue Mion, PLLC

(57) ABSTRACT

The disclosed is a redispersible agglomerate of fine carbon fibers, which is obtained by adding the fine carbon fibers and a dispersing agent which shows solid state at least at ordinary temperature (20±10° C.) into an aqueous dispersion medium, and then removing the dispersion medium from a dispersion system where the carbon fibers are isolated individually and dispersed in the dispersion medium; and in which the carbon fibers are got together and solidified in the agglomerate while each carbon fiber maintains its isolated dispersibility;
wherein the carbon content is in the range of 0.01-99.5% by weight, the dispersing agent content is in the range of 0.1-99.5% by weight, and the moisture content is in the range of less than. 10% by weight, based on the total weight of the agglomerate; and
wherein the dispersing agent is one member selected from the group consisting of (1) surfactants capable of forming spheroidal, cylindrical, or tabular micelles of 5-2000 nm in diameter in an aqueous solution; (2) water-soluble high polymers having a weight average molecular weight in the range of 10,000-50,000,000; and (3) a combination of cyclodextrin and fullerene.
This redispersible agglomerate of fine carbon fibers has a good handling property and would form a dispersed state of individually isolated carbon fibers when it is added in any of various dispersion media.

6 Claims, 4 Drawing Sheets

U.S. PATENT DOCUMENTS

| | | |
|---|---|---|
| 2003/0170166 A1 | 9/2003 | Smalley et al. |
| 2003/0170167 A1 | 9/2003 | Nikolaev et al. |
| 2005/0100501 A1 * | 5/2005 | Veedu et al. ............... 423/447.2 |
| 2006/0078730 A1 | 4/2006 | Tsukada et al. |
| 2006/0104887 A1 | 5/2006 | Fujioka et al. |
| 2008/0023396 A1 * | 1/2008 | Fugetsu ..................... 210/502.1 |

FOREIGN PATENT DOCUMENTS

| | | | |
|---|---|---|---|
| JP | 2005-122930 A | | 5/2005 |
| JP | 2005-263608 A | | 9/2005 |
| JP | 2006-182601 A | | 7/2006 |
| JP | 2006-183225 A | | 7/2006 |
| JP | 2006-265151 A | | 10/2006 |
| JP | 2006-265751 A | | 10/2006 |
| JP | 2006265751 A | * | 10/2006 |
| JP | 2007-039623 A | | 2/2007 |
| WO | WO 03/004740 A1 | | 1/2003 |
| WO | WO 03060941 A2 | * | 7/2003 |
| WO | WO 2004024428 A1 | * | 3/2004 |
| WO | 2004/070094 A1 | | 8/2004 |
| WO | 2005/110594 A1 | | 11/2005 |
| WO | WO 2005110594 A1 | * | 11/2005 |

OTHER PUBLICATIONS

"3-(N,N-Dimethyloctadecylammonio)propanesulfonate Material Safety Datasheet". Sigma-Aldrich, Apr. 5, 2011.*

Tae-Hwan Kim, Changwoo Doe, Steven R. Kline, and Sung-Min Choi; "Water-Redispersible Isolated Single-Walled Carbon Nanotubes Fabricated by In Situ Polymerization of Micelles". Adv. Mater. 2007, 19, 929-933 (Article first published online: Mar. 12, 2007).*

Rajdip Bandyopadhyaya, Einat Nativ-Roth, Oren Regev, and Rachel Yerushalmi-Rozen; "Stabilization of Individual Carbon Nanotubes in Aqueous Solutions" . Nano Letters 2002. 2 (1) 25-28.*

* cited by examiner

REDISPERSIBLE AGGLOMERATE OF FINE CARBON FIBERS AND METHOD FOR PRODUCING THEREOF

CROSS REFERENCE TO RELATED APPLICATIONS

This application is a National Stage of International Application No. PCT/JP2008/058393 filed May 1, 2008, claiming priority based Japanese Patent Application No. 2007-122830, filed May 7, 2007, the contents of all of which are incorporated herein by reference in their entirety.

TECHNICAL FIELD

This invention relates to a redispersible agglomerate of fine carbon fibers which sustains isolatedly dispersible fine carbon fibers as solid and method for manufacturing thereof. More particularly, this invention relates to the redispersible agglomerate of fine carbon fibers which has an excellent handling property and which can easily form a dispersed state of individually isolated carbon fibers when it is added in any of various dispersion media; and a method for manufacturing thereof.

BACKGROUND ART

Fine carbon fibers such as the carbon nano structures, typically, for example, carbon nanotubes (Hereafter, it is referred to as "CNT") has been developed, and the attempts to try to improve physical properties of various matrices by adding the fine carbon fibers into various matrices so as to form composite materials has been performed widely in recent years.

The graphite layers that make up the carbon nano structures are materials normally comprised of regular arrays of six-membered rings whose structures can bring about specific electrical properties, as well as chemically, mechanically, and thermally stable properties. As long as such fine carbon fibers can retain such properties upon combining and dispersing into a matrix, their usefulness as an electroconductive or antistatic material can be expected.

However, cohesion by the van der Waals force between adjacent CNTs is caused easily in such CNTs, and in particular, single wall carbon nanotubes (Hereafter, the single wall carbon nanotube is also referred to as "SWCNT") because the all of the constituent atoms thereof are surface atoms. Thus, it has been known that strong cohesion (bundle) structure consisting of plural CNTs has been already formed at the time of synthesis of CNTs. Therefore, when the CNTs are used as they are, dispersion of CNTs in a film formable composition would hardly progress, and which would be followed by inferior properties of the film formed thereby.

In addition, the fine carbon fibers show very bad handling property because the fine carbon fibers are supplied as an aggregate of fluffy or powdery form having a very low bulk density, and have a problem that the fine fibers are easily airborne around the working environment atmosphere when using them.

In order to solve such a handling problem, some attempts have been made to add the fine carbon fibers into various resins so as to pelletize or to make them up into a masterbatch before using them. The handling property has been improved certainly by the pelletization or masterbatching. When the pellet or masterbatch is further added and diluted into a resin matrix or the like, however, the dispersion of fine carbon fibers have not progressed well, with the result that the fine carbon fibers have existed as their aggregated state of some degree in the matrix.

On the other hand, various researches has been advanced as a technology to improve the dispersion property of the fine carbon fibers. For instance, various methods, such as (1) methods for dispersing fine carbon fibers to a dispersion medium by a physical treatment such as supersonic wave, various stirring devices or the like (for instance, Patent Literature 1, etc.); (2) methods for dispersing fine carbon fibers to a dispersion medium by modifying chemically the fine carbon fibers (for instance, Patent Literature 2, etc.); and (3) methods for dispersing carbon nano tubes to a dispersion medium by using a dispersing agent such as surfactant or the like (for instance, see Patent Literature 3) have been reported.

Since many of the above mentioned technologies to improve the dispersion property of the fine carbon fibers provide the fine carbon fibers as a dispersion form of them in a liquid dispersion medium, the handling property of the fine carbon fibers can be improved up to a certain extent as compared with the case of the fluffy or powdery form.

Even though the liquid dispersion is formed, however, the handling property of the fine carbon fibers does not still attain to a sufficient level. Further, depending on the kind of the matrix to be complexed with the fine carbon fibers, the liquid dispersion medium would become an obstacle, and a phase of requiring removal of the dispersion medium would arise.

On the other hand, in the case of manufacturing solid products, such as electron emitter, by using such fine carbon fibers, it has been widely proposed that the fine carbon fibers are made into a paste form by adding and dispersing them to resinous component, surfactant, thickener, etc. (for instance, see Patent Literatures 4 and 5, etc.)

Such a resinous paste including fine carbon resin content paste shows a good handling property and the dispersibility of the fine carbon fibers in the paste attains an ample level. As for the paste, however, it is out of consideration that the paste is further added to a dispersion medium or the like so as to redisperse the fine carbon fibers into the dispersion medium. Because, the paste is prepared, with the aim of solidifying it as is, after molding into a prescribed shape for a product intended. In addition, as a matter of fact, the dispersibility of the fine carbon fibers in the paste system is maintained to a certain extent with the consistency of the paste. Thus, even if the paste is added into an appropriate dispersion medium, a result that the cohesiveness of the fine carbon fibers becomes strengthened would be liable to occur, instead of obtaining a dispersed state of individually isolated fine carbon fibers.

[Patent Literature 1] JP 2004-256964, A
[Patent Literature 2] JP 2006-265151, A
[Patent Literature 3] JP 2005-263608, A
[Patent Literature 4] JP 2005-122930, A
[Patent Literature 5] JP 2006-182601, A

[Disclosure of the Invention]
[Problems to be Solved by the Invention]

Therefore, the present invention aims to provide a redispersible agglomerate of fine carbon fibers which has a good handling property, and which can easily form the dispersed state of individually isolated fine carbon fibers when it is added to any of various dispersion media; and a method for manufacturing thereof.

[Means for Solving the Problem]

The present invention that solves the above-mentioned problem is a redispersible agglomerate of fine carbon fibers, which is characterized in that it is obtained by adding the fine carbon fibers and a dispersing agent which shows solid state at least at ordinary temperature (20±10° C). into an aqueous dispersion medium, and then removing the dispersion medium from a dispersion system where the carbon fibers are isolated individually and dispersed in the dispersion medium; and that the carbon fibers are got together and solidified in the agglomerate while each carbon fiber maintains its isolated dispersibility;

wherein the carbon content is in the range of 0.01-99.5% by weight, the dispersing agent content is in the range of 0.1-99.5% by weight, and the moisture content is in the range of less than 10% by weight, based on the total weight of the agglomerate; and wherein the dispersing agent is one member selected from the group consisting of (1) surfactants capable of forming spheroidal, cylindrical, or tabular micelles of 5-2000 nm in diameter in an aqueous solution; (2) water-soluble high polymers having a weight average molecular weight in the range of 10,000-50,000,000; and (3) a combination of cyclodextrin and fullerene.

The present invention also provides the redispersible agglomerate of fine carbon fibers, wherein the redispersible agglomerate of fine carbon fibers is formed into a block or granules.

Further, the present invention provides the redispersible agglomerate of fine carbon fibers, wherein each fine carbon fiber comprises tubular graphene sheets layered in a direction orthogonal to the axis of the fine carbon fiber, wherein the tubular graphene sheets include polygonal cross sections in a direction orthogonal to the axis of the fine carbon fiber, wherein a maximum diameter of the cross sections is in the range of 15 to 100 nm, an aspect ratio of the fine carbon fiber is not more than $10^5$, and $I_D/I_G$ of the fine carbon fiber as determined by Raman spectroscopy at 514 nm is not more than 0.1.

Further, the present invention provides the redispersible agglomerate of fine carbon fibers, wherein carbon fibrous structures are used as the fine carbon fibers, each carbon fibrous structure comprising a three dimensional network of carbon fibers, said carbon fibers each having an outside diameter of 1-100 nm, said carbon fibrous structure further comprising a granular part with which said carbon fibers are bound in a state that said carbon fibers extend outwardly from the granular part, and the granular part being produced in a growth process of the carbon fibers; and, wherein the dispersion system where the carbon fibers are isolated individually and dispersed in the dispersion medium is formed by a dispersion treatment of using a media mill.

The present invention that solves the above-mentioned problem is also a method for manufacturing redispersible agglomerate of fine carbon fibers, wherein the carbon fibers are got together and solidified while each carbon fiber maintains its isolated dispersibility, which method comprises adding (A) the fine carbon fibers and (B) a dispersing agent into an aqueous dispersion medium, wherein the dispersing agent is one member selected from the group consisting of (1) surfactants capable of forming spheroidal, cylindrical, or tabular micelles of 5-2000 nm in diameter in an aqueous solution, (2) water-soluble high polymers having a weight average molecular weight in the range of 10,000-50,000,000, and (3) a combination of cyclodextrin and fullerene;

isolating the carbon fibers individually and dispersing them in the dispersion medium to form a dispersion system; and then removing the dispersion medium from the dispersion system.

The present invention also provides method for manufacturing redispersible agglomerate of fine carbon fibers, wherein the dispersion medium removes from a dispersion system at a temperature in the range of −197° C. to 450° C.

The present invention also provides method for manufacturing redispersible agglomerate of fine carbon fibers, wherein carbon fibrous structures are used as the fine carbon fibers, each carbon fibrous structure comprising a three dimensional network of carbon fibers, said carbon fibers each having an outside diameter of 1-100 nm, said carbon fibrous structure further comprising a granular part with which said carbon fibers are bound in a state that said carbon fibers extend outwardly from the granular part, and the granular part being produced in a growth process of the carbon fibers; and, wherein the dispersion system where the carbon fibers are isolated individually and dispersed in the dispersion medium is formed by a dispersion treatment of using a media mill.

[Effect of the Invention]

With respect to the redispersible agglomerate of fine carbon fibers according to the present invention, since the fine carbon fibers are got together and solidified in the agglomerate while each carbon fiber maintains its isolated dispersibility, it can show an excellent handling property, the isolated dispersibility can be maintained stably for a long time, and the problem that the fine fibers are airborne around the working environment atmosphere when using or transporting the fine carbon fibers is not caused. In addition, when the agglomerate of fine carbon fibers is added to any of various media, the agglomerate can separate easily and promptly into mutually independent carbon fibers in the medium and disperse the carbon fibers uniformly in the medium. Therefore, the agglomerate of fine carbon fibers can be suitably used for various usages in which the fine carbon fibers are complexed into various materials to obtain desired products.

PREFERRED EMBODIMENTS OF THE INVENTION

Figure 1:
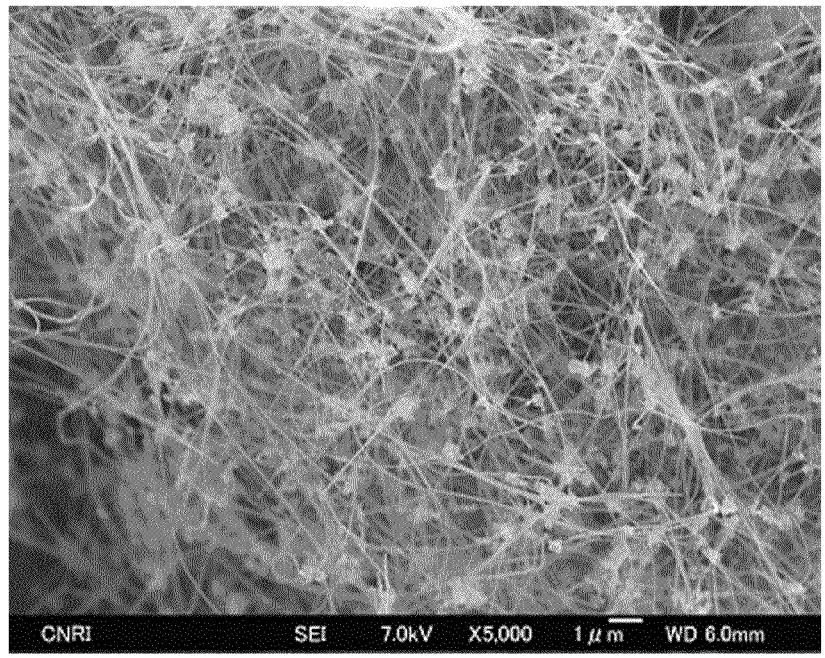
[FIG. 1] is a SEM photo of an intermediate for the carbon fibrous structure which was used to prepare the redispersible agglomerate of fine carbon fibers according to the present invention.

Hereafter, the present invention will be described in detail on the basis of some preferred embodiments.

The redispersible agglomerate of fine carbon fibers according to the present invention contains carbon fibers and a dispersing agent which shows solid state at least at ordinary temperature (20±10° C.) as described in detail below.

Although the contents of respective components in the redispersible agglomerate of fine carbon fibers may vary in some degree depending on the kind of the carbon fibers used and the kind of the dispersing agent used, it is desirable that the fine carbon fiber content is in the range of 0.01-99.5% by weight, more preferably, in the range of 20-80% by weight, and the dispersing agent content is in the range of 0.1-99.5% by weight, more preferably, in the range of 5-30% by weight, based on the total weight of the agglomerate. Further, as for the moisture content, although substantially zero is the most desirable, the agglomerate may contain the moisture, for instance, at a level of less than 10% by weight, more preferably, less than 5% by weight, based on the total weight of the agglomerate, as long as the agglomerate can keep and maintain its solid state.

Although the dispersing agents capable of being included in the redispersible agglomerate of fine carbon fibers have mutually different functions and mechanisms, as a general rule, the molecules of the dispersing agent can be located between the individual fine carbon fibers, and thereby the cohesion of fine carbon fibers is obstructed and the dispersed state of individually isolated carbon fibers is kept and maintained with stability Incidentally, in the redispersible agglomerate of fine carbon fibers according to the present invention, the dispersing agent is not one which was mixed directly with the fine carbon fibers, for instance, not one which was mixed with the fine carbon fibers in a solid phase condition, but the dispersing agent is one which is included in the agglomerate by the following procedure: once distributing into an aqueous dispersion medium along with the fine carbon fibers; undergoing a dispersion treatment so that the fine carbon fibers are isolated individually and dispersed in the aqueous dispersion medium; and thereafter removing the dispersion medium so as to solidify the dispersion system while maintaining the isolated dispersibility of individual fine carbon fibers.

Hereafter, the present invention will be described in detail with a particular emphasis on the method for manufacturing of the redispersible agglomerate of fine carbon fibers.

Carbon Fiber Dispersed Liquid

In the manufacturing method of the redispersible agglomerate of fine carbon fibers according to the present invention, carbon fiber dispersed liquid, where the fine carbon fibers are included while the fine carbon fibers are uniformly dispersed as the isolated dispersion or dissolved in an aqueous medium by the function of the dispersing agent, is at first prepared.

Although there is no particular limitation for the content of carbon fibers in the carbon fiber dispersed liquid as long as the superior isolatedly dispersed condition of carbon fibers is kept and maintained, for instance, it may be in the range of 0.01-95% by weight, more preferably, in the range of 0.5-80% by weight, based on the total weight of the carbon fiber dispersed liquid.

(a) Aqueous Medium

As the medium used in preparing the carbon fiber dispersed liquid, an aqueous medium is used from the relation to the dispersing agent described later.

As the aqueous medium, as long as it can form a system where the dispersing agent described later effectively acts to the fine carbon fibers, there is no particular limitation, and thus, water, or any mixture solvent of water and a water-miscible organic solvent can be used. As the water-miscible organic solvent, for instance, alcohols such as lower alcohol of about C1-C6, for example, methanol, ethanol, propanol, etc.; ketones such as acetone, methyl ethyl ketone, etc.; ethers such as dioxane, ethyl ether, tetrahydrofuran, etc.; esters such as methyl acetate, ethyl acetate, etc.; dimethyl formamide, or the like, can be enumerated.

(b) Fine Carbon Fiber

As typical examples of the fine carbon fibers which are once dispersed into the aqueous dispersing medium and thereafter included in the redispersible agglomerate of fine carbon fibers, the ones which each mainly comprises six-membered ring array structure of the carbons, and wherein at least one dimension of three dimensions of the structure lies in the nano order range, for instance, in the range of several nm to several hundreds nm, may be enumerated, although the fine carbon fibers used in the present invention are not limited thereto.

As the six-membered ring array structure of carbons, sheet-like graphite (graphene sheet) can be typically enumerated, and further, for instance, structures in which five-membered ring(s) and/or seven-membered ring(s) are in combination with the six-membered rings of the carbons can be involved in the six-membered ring array structure.

More concretely, for instance, single wall carbon nanotubes each consisting of a cylindrically rolled graphene sheet having a diameter of about several nm; multi wall carbon nanotubes each consisting of several cylindrical graphene sheets, which are layered one over another in a direction substantially orthogonal to the axis of the nanotube; and carbon nanohorns each consisting of a single wall carbon nanotube having an conically closed end, etc., can be enumerated. In addition, carbon nanohorn aggregates which are spheroidal aggregates of the above mentioned carbon nanohorn and have a diameter of about 100 nm; carbon onions which each has the six-membered ring array structure of carbons; and fullerene and the nanocapsule in which five-membered rings are introduced into the six-membered ring array structure of carbons are also involved. These fine carbon fibers may be used singly or in a mixture of any combination of two or more kinds. Moreover, the ones that are obtained by pulverizing such fine carbon fibers can be also used in the present invention.

As the method for synthesizing the fine carbon fibers, a method in which an organic compound, such as a hydrocarbon, is chemically decomposed in CVD process using ultra fine metallic particles as catalyst, and fibers (hereinafter, they are also referred to as "intermediate" or "first intermediate") are produced while shortening the residence time for ultrathin carbon fiber nucleus, intermediate product, and fibers as the product in the generation furnace, and thereafter the obtained intermediate undergoes a high temperature heat treatment is preferable.

In order to obtain such fine carbon fibers, concretely, a raw material organic compound, and a mixture of a transition metal or transition metal compound and sulfur or sulfur compound as a catalyst are heated to a temperature of not less than 300° C. along with an atmosphere gas in order to gasify them. Then, the gasified mixture is added to the generation furnace and heated therein at a constant temperature in the range of 800-1300° C., preferably, in the range of 1000-1300° C., in order to synthesize fine carbon fibers by dint of improvement of minute particle formation of catalyst metal and decomposition of hydrocarbon. The carbon fiber products (as the intermediate or first intermediate) thus obtained would include unreacted raw materials, nonfibrous carbons, tar, and catalyst metal.

Next, the intermediate (or first intermediate) in its as-is powder state, without subjecting it to compression molding, is subjected to high temperature heat treatment either in one step or two steps.

In the one-step operation, the intermediate is conveyed into a heating furnace along with the atmosphere gas, and then heated to a temperature (preferably a constant temperature) in the range of 800-1200° C. to remove the unreacted raw material, and volatile flux, such as tar, by vaporization. Thereafter, it is heated to a temperature (preferably a constant temperature) in the range of 2400-3000° C. to improve the structures of the multilayers in the fibers, and, concurrently, to vaporize the catalyst metal included in the fibers to produce refined fine carbon fibers.

Alternatively, when the high temperature heat treatment is performed in two steps, the first intermediate is conveyed, along with the atmosphere gas, into a first heating furnace that is maintained at a temperature (preferably a constant temperature) in the range of 800-1200° C. to produce a fine carbon fiber (hereinafter, referred to as "second intermediate"). The heat treatment removes unreacted raw materials, and volatile flux such as tar by vaporization. Next, the second intermediate is conveyed, along with the atmosphere gas, into a second heating furnace that is maintained at a temperature (preferably a constant temperature) in the range of 2400-3000° C. to improve the structures of the multilayers in the fibers, and, concurrently, to vaporize the catalyst metal that is included in the second intermediate to produce refined ultrathin carbon fibers. It is desirable that the heating period for the second intermediate in the second heating furnace is in the range of 5-25 minutes, and the bulk density of the second intermediate in the second heating furnace is adjusted to be not less than 5 kg/m$^3$ and less than 20 kg/m$^3$, preferably, not less than 5 kg/m$^3$ and less than 15 kg/m$^3$. When the bulk density of the intermediate is less than 5 kg/m$^3$, the powder does not flow easily so as to achieve good heat treatment efficiency. When the bulk density of the intermediate is not less than 20 kg/m$^3$, the final product does not readily disperse on mixing with resins, although the heat treatment efficiency of the intermediate is good.

The generation furnace used in this process is preferably a vertical type. The high temperature heating furnaces used in this process may be a vertical type or horizontal type; however, the vertical type is preferred because it allows the intermediate to fall down.

As raw material organic compounds to be used in the above mentioned synthesis method, hydrocarbons such as benzene, toluene, and xylene; carbon monoxide (CO); or alcohols such as ethanol may be used. As an atmosphere gas, inert gas such as argon, helium, xenon; or hydrogen may be used.

As catalysts, a mixture of a transition metal such as iron, cobalt, molybdenum or a transition metal compound such as ferrocene, metal acetate, and sulfur or a sulfur compound, such as thiophene or ferric sulfide, may be used.

According to the synthesis method as mentioned above, fine carbon fibers, which each comprises tubular graphene sheets layered in a direction orthogonal to the axis of the fine carbon fiber, wherein the tubular graphene sheets include polygonal cross sections in a direction orthogonal to the axis of the fine carbon fiber, wherein a maximum diameter of the cross sections is in the range of 15 to 100 nm, an aspect ratio of the fine carbon fiber is not more than 10$^5$, and $I_D/I_G$ of the fine carbon fiber as determined by Raman spectroscopy at 514 nm is not more than 0.1, would be obtained.

Therefore, it is possible to obtain the carbon fibers which have a small D band detected by the Raman spectroscopy, and thus have fewer defects in the graphene sheets. Further, the carbon fibers show polygonal figures as the cross sections, and carbon fibers are denser and have fewer defects in both the stacking direction and the surface direction of the graphene sheets that comprise the carbon fibers. Thus, the flexural rigidity of the carbon fibers is improved. As the result, the fine carbon fibers which resist cohesion and is suitable for the purpose of using it as a material to be dispersed, can be obtained.

Herein, as more preferable fine carbon fibers used for the present invention, carbon fibrous structures which each comprises a three dimensional network of carbon fibers, the carbon fibers each having an outside diameter of 1-100 nm, the carbon fibrous structure further comprising a granular part with which the carbon fibers are bound in a state that the carbon fibers extend outwardly from the granular part, and the granular part being produced in a growth process of the carbon fibers, would be exemplified.

When obtaining the carbon fibrous structures, in addition to the above mentioned procedure, it is preferable to use as carbon sources at least two carbon compounds which have different decomposition temperatures. The words "at least two carbon compounds" used herein not only include two or more kinds of raw materials, but also include one kind of raw material that can undergo a reaction, such as hydrodealkylation of toluene or xylene, during the course of synthesis of the fibrous structures such that in the subsequent thermal decomposition procedure it can function as at least two kinds of carbon compounds having different decomposition temperatures.

The thermal decomposition reaction of the hydrocarbon raw material mainly occurs on the surface of the catalyst particles or on growing surface of granular parts that have grown around the catalyst particles as the nucleus, and the fibrous growth of carbon may be achieved when the recrystallization of the carbons generated by the decomposition progresses in a constant direction. When obtaining carbon fibrous structures as mentioned above, however, the balance between the thermal decomposition rate and the carbon fiber growth rate is intentionally varied. Namely, for instance, as mentioned above, to use as carbon sources at least two kinds of carbon compounds having different decomposition temperatures may allow the carbonaceous material to grow three dimensionally around the granular part as a centre, rather than in one dimensional direction. The three dimensional growth of the carbon fibers depends not only on the balance between the thermal decomposition rate and the growing rate, but also on the selectivity of the crystal face of the catalyst particle, residence time in the reaction furnace, temperature distribution in the furnace, etc. The balance between the decomposition rate and the growing rate is affected not only by the kinds of carbon sources mentioned above, but also by reaction temperatures, and gas temperatures, etc. Generally, when the growing rate is faster than the decomposition rate, the carbon material tends to grow into fibers, whereas when the thermal decomposition rate is faster than the growing rate, the carbon material tends to grow in peripheral directions of the catalyst particle. Accordingly, by changing the balance between the thermal decomposition rate and the growing rate intentionally, it is possible to control the growth of carbon material to occur in multi-direction rather than in single direction, and to produce three dimensional structures according to the present invention.

In addition, it is desirable that the diameter of t he granular part is larger than the outside diameter of the fine carbon fibers, although this point is not a particular limitation. When the granular part, which is the binding site of the carbon fibers, has a much larger particle diameter, it is possible to provide stronger binding force against the carbon fibers that are externally elongated from the granular part, and thus, even when the carbon fibrous structures are exposed to a relatively high shear stress during combining with a matrix such as resin, they can be dispersed as maintaining its three-dimensional carbon fibrous structures into the matrix. The "particle diameter of the granular part" used herein is the value which is measured by assuming that the granular part, which is the binding site for the mutual carbon fibers, is one spherical particle.

When using such carbon fibrous structures on the production of the redispersible agglomerate of fine carbon fibers according to the present invention, it becomes easy to isolatedly disperse the carbon fibrous structures in the dispersion medium, since the carbon fibrous structures are able to exist in the dispersing medium while maintaining their bulky configuration.

(c) Dispersing Agent

The dispersing agent which is used for manufacturing the redispersible agglomerate of fine carbon fibers according to the present invention, which is added into the aqueous medium, and which is contained in the redispersible agglomerate of fine carbon fibers according to the present invention in order to sustain the isolatedly dispersed condition of the individual fine carbon fibers without causing mutual cohesion of the fine carbon fibers, is the one which shows solid state at least at ordinary temperature (20±10° C.), and which is one member selected from the group consisting of (1) surfactants capable of forming spheroidal, cylindrical, or tabular micelles of 5-2000 nm in diameter in an aqueous solution; (2) water-soluble high polymers having a weight average molecular weight in the range of 10,000-50,000,000; and (3) a combination of cyclodextrin and fullerene.

Although these dispersing agents have mutually different functions and mechanisms depending on their kinds, as a general rule, the molecules of the dispersing agent can be located between the individual fine carbon fibers, and thereby the cohesion of fine carbon fibers is obstructed and the dispersed state of individually isolated carbon fibers is kept and maintained with stability (1) Micelle Type and (2) Pseudomicelle Type The first preferable dispersing agent used in the present invention is (1) surfactants capable of forming spheroidal, cylindrical, or tabular micelles of 5-2000 nm in diameter in an aqueous solution (hereafter, it is referred to as "micelle type"); and the second preferable dispersing agent is (2) water-soluble high polymers having a weight average molecular weight in the range of 10,000-50,000,000 (hereafter, it is referred to as "pseudomicelle type").

The surfactant used as the above mentioned (1) micelle type can form spheroidal, cylindrical, or tabular micelles of 5-2000 nm in diameter, preferably, 50-300 nm in diameter in an aqueous solution. Although the reason why the micelle of this size is preferable is not clear, it is guessed that there are the following reasons. For instance, in the case of carbon nanotubes, the length thereof is usually in the range of 100-1000 nm. The carbon nanotubes would be folded to a fraction of the length (for instance, one-quarter or so) in solution which contains the surfactant (micelle type), and as the result, the carbon nanotubes come to have a length of several tens of nm to several hundreds of nm in the solution. Perhaps, such a size may be suitable to store the folded carbon nanotube in the micelle, and as a consequence of this logic, it can understood that the carbon nanotubes are efficiently solubilized in the solution. With respect to the other types of fine carbon fibers, it is also presumed that the fiber would be stored in the micelle by dint of similar function and mechanisms.

The enclosed state that each fine carbon fiber is surrounded with molecules of the surfactant is maintained even after the dispersion medium is removed from the dispersion system. In the solid phase formed after the removal of the dispersion medium, since surfactant molecules belonging to a group which surround one fine carbon fiber and surfactant molecules belonging to another group which surround another fine carbon fiber are attracting mutually with electrostatic forces, the molecules are being in the state of coagulation. In the solid phase, however, the fine carbon fibers keep and maintain their individual isolatedly dispersed condition, because such surfactant molecules are interposed between the fine carbon fibers. Therefore, when the agglomerate of the present invention is again thrown into dispersion medium, the fine carbon fibers would be easily and uniformly dispersed throughout the system. With respect to the (2) the pseudomicelle type, water-soluble high polymers, it is also presumed that the individual fibers would be isolatedly dispersed by dint of similar function and mechanisms.

Incidentally, the technology of adding a surfactant other than the above mentioned types to the fine carbon fiber has been known (For instance, see JP 2002-255528 A). However, the micelles formed by this surfactant is very small, as about 0.1 nm, and thus, the principle of this technology is that the carbon nanotube adheres to the surfaces of the micelles. The suitable types as described above is based on a novel idea of storing the nano carbon (for instance, carbon nanotube) inside a micelle, rather than adhering to surface of micelle.

The "micelle" used herein denotes a micelle which is formed with the surfactant, and holds a storing space, such as spheroidal, cylindrical, or tabular space, etc. For instance, in the case of phospholipid type surfactant, the micelle is also called "liposome". Further, the diameter of the micelle indicates the value measured according to light scattering method (pH unadjusted, at 20° C. solution).

The surfactant type may not be especially limited as long as the above mentioned characteristics are satisfied. For instance, both of phospholipid type surfactants and non-phospholipid type surfactants as indicated below may be utilizable.

Herein, the "phospholipid type surfactant" denotes anionic or ampholytic surfactant which has phosphate group as functional group, and it may be any one of phospholipids (involving both of glycerophospholipids and sphingophospholipids) and modified-phospholipids (for instance, hydrogenated phospholipids, lysophospholipids, enzyme-modified phospholipids, lysophosphatidyl glycerol, complexes with other substance). Such phospholipids may exist in various membrane systems for cells of organisms, for instance, protoplasmatic membrane, nuclear envelope, endoplasmic reticulum membrane, mitochondrial membranes, the Golgi apparatus membranes, lysosomal membrane, chloroplast membrane, and bacterial cell membranes, and preferably, phospholipids used to make the liposome are suitable. Concretely, for instance, phosphatidylcholines (for instance, distearoyl phosphatidylcholine (DSPC), dimyristoyl phosphatidylcholine (DMPC), dipalmitoyl phosphatidylcholine (DPPC)); phosphatidylethanolamines; phosphatidylinositols; hosphatidylserines; phosphatidylglycerols; diphosphatidylglycerols; lysophosphatidylcholines; and sphingomyelins can be enumerated.

In addition, copolymer of 2-methacryloyloxyphosphorylcholine (MPC) and n-butyl methacrylate (BMA), etc. can be also used.

The "non-phospholipid type surfactant" denotes non-ionic or ampholytic surfactant which does not contain phosphate group as functional group. For instance, 3-(N,N-dimethyl stearyl ammonio)-propane sulfonate, 3-[(3-cholamidopropyl)dimethyl ammonio]-2-hydroxy-1-propane sulfonate (CHAPSO), 3-[(3-cholamidopropyl)diethyl ammonio]-propane sulfonate (CHAP), and N,N-bis(3-D-gluconamidopropyl)-cholamide can be enumerated.

Further, if necessary, it is also possible to use this type surfactant in combination with other surfactant, for instance, dodecyl sulfate salts, etc.

Next, the (2) pseudomicelle type will be described. The water-soluble high polymer used as this type is the one which has a weight average molecular weight of 10,000-50,000,000 (preferably, 10,000-5,000,000). Herein, the weight average molecular weight is the one based on the value measured by the gel filtration high performance liquid chromatography in which pullulan is used as standard.

The above mentioned water-soluble high polymer is not especially limited as long as the above mentioned molecular weight is possessed. For instance, various botanical surfactants; water-soluble polysaccharides, for instance, alginic acids such as alginic acid and propylene glycol alginate, gum arabic, xanthan gum, hyaluronic acid, chondroitin sulphate; water-soluble cellulose or derivatives thereof such as salts and esters, for instance, cellulose acetate, methyl cellulose, hydroxy propyl methyl cellulose, chitosan, and chitins; water-soluble protein, for instance, gelatin and collagen; polyoxyethylene-polyoxypropylene block copolymer; and DNAs can be enumerated.

With respect to the aqueous solution system that uses the dispersing agent of the micelle type or the pseudomicelle type, in the case that a crude product is used as the fine carbon fibers to be dispersed in the system, it is preferable that, at first, the dispersion medium further contains a permeant capable of passing through the fine carbon fiber and an oxidant, and it is in the condition of alkaline aqueous solution. Herein, the "at first" means that neither these materials nor the condition are indispensable, once the film is finally formed. Namely, these materials and the condition are added and adjusted in order to remove undesired ingredients that may exist in the system when the crude product is used as fine carbon fiber.

This preferable embodiment will be described below.

First, the "permeant capable of passing through the fine carbon fiber" means the material which has a diameter that is smaller than the size of C—C lattice of the fine carbon fiber. For instance, a cation capable of passing through the fine carbon fiber which has such diameter (ion diameter), concretely, for example, lithium ion, can be enumerated. Although hydrogen ion is smaller than the lattice size, however, it is inappropriate as the cation capable of passing through the fine carbon fiber since it would be lost to water as the form of oxonium ion. Although the role of the permeant capable of passing through the fine carbon fiber is not clear accurately, for instance, in the case of the cation capable of passing through the fine carbon fiber, it is guessed that the cation would play a role of changing the charge state in the interior of the fine carbon fiber, and a role of pushing impurities out from the surface and inside of the fine carbon fiber, with invasion of the cation into the fine carbon fiber.

The content of this permeant capable of passing through the fine carbon fiber would be preferably in the range of 0.1-1 mol per a liter of aqueous solution, in the case of the aqueous solution for 1 g of fine carbon fibers.

Next, the oxidant will be described. Although the oxidant that can be used is not especially limited, any persulfate (which exists as persulfate ion in solution) is suitable. Because, the persulfate can show high activity under alkaline condition, and the after treatment is also easy since it becomes sulfuric acid after it acts on the oxidization.

Moreover, it is desirable that the pH of the aqueous solution is in the range of 6-14, and in particular, shows alkalinity, although the pH is not especially limited to the above range. Although the reason why such pH range is preferable is not clear, it is guessed that such pH range would play the role to change the electron state on the surface of carbon fiber. In addition, in the case of the carbon nanotubes, such pH range would play the role to soften the surfaces of the carbon nanotubes, and to fold the individual carbon nanotubes. The range of pH 10-14 is more preferable in case of the micelle type, while the range of pH 6-12 is more suitable in the case of the pseudomicelle type.

In addition, when alginic acid is used as a dispersing agent of the pseudomicelle type, the alginic acid can form a high viscosity aqueous solution under alkaline condition, although the alginic acid is insoluble in water under neutral or acidic condition. Therefore, when a larger volume of the alginic acid should be contained in the solvent or dispersion medium, keeping to alkalinity is desirable.

Next, the carbon fiber dispersed liquid which uses the above-mentioned micelle type and pseudomicelle type as a dispersing agent will be described.

In the case of using the micelle type surfactant, the content of the surfactant in solution should be more than the critical micelle concentration at which the surfactant comes to form micelles. Usually, the content would be in the range of 0.2-10 mmol per a liter of the aqueous solution for 1 g of fine carbon fibers. In the case of using the pseudomicelle type, although the content of the surfactant in solution is not especially limited, usually, it would be in the range of 5-50 g per a liter of the aqueous solution for 1 g of fine carbon fibers.

Then, carbon fibers, for instance, carbon nanotubes would be added into the aqueous solution which contains such micelle type or pseudomicelle type dispersing agent. Although the adding amount of the fine carbon fibers is not especially limited, usually, it would be about 1-5 g per a liter of aqueous solution for preparation in the case of containing the micelle type, and it would be about 1-10 g per a liter of aqueous solution for preparation in the case of containing the pseudomicelle types.

After the addition of the fine carbon fibers, in the case of using the micelle type, it would be suitable to apply supersonic wave to the mixture at first for about five minutes in order to disentangle the fine carbon fibers and to stimulate the completely isolated dispersion or dissolution of the carbon fibers, for instance, carbon nanotubes. Afterwards, when the mixture stands, for instance, for about 6 hours at a room temperature, or for a few minutes under warming at 60° C., the fine carbon fibers or carbon nanotubes would be completely isolated and dispersed or dissolved.

In the case of using the pseudomicelle type, the mixture including the pseudomicelle forming material, for instance, the sodium alginate; the permeant, for instance, the hydroxide lithium; the oxidant, for instance, sodium persulfate; the nanocarbons; and demineralized water, would be left standing at 40° C. for about one day after diffusing and dispersing adequately. When neither the permeant nor the oxidant are used, the mixture would be left standing at 40° C. for about one week.

(3) Cyclodextrin Clathrate of Fullerene

The third preferable dispersing agent used in the present invention is cyclodextrin and fullerene. Herein, either of cyclodextrins of the a type whose number of glucose residues is six, the β types of seven glucose residues, and the y types of eight glucose residues, can be used. Further, the branched cyclodextrins such as maltosyl cyclodextrin, dimethyl cyclodextrin; the modified cyclodextrins; or the cyclodextrin polymers, etc., would be also utilizable.

It is considered that the mechanism of allowing the fine carbon fibers to disperse isolatedly by dint of this dispersing agent of the type (3) is that the hydrophobic fullerene would be at first enclosed with the cyclodextrins, and then, the hydrophobic fullerene at the surface of the clathrate would be bound to the hydrophobic fine carbon fiber by dint of the affinity between them. When the cyclodextrin clathrates of fullerenes are bound to the fine carbon fibers, the fine carbon fibers on the condition of being mutually aggregated are separated from each other and individually isolated and dispersed. Such a condition that the individual fine carbon fibers are bound to the cyclodextrin clathrates of fullerenes is kept and maintained even after removal of the dispersion medium. In the solid phase formed after the removal of the dispersion medium, since cyclodextrin on the surface of a cyclodextrin clathrate of fullerene which is bound to one fine carbon fiber and cyclodextrin on the surface of another cyclodextrin clathrate which is bound to another fine carbon fiber are attracting mutually with electrostatic forces, they are being in the state of coagulation. In the solid phase, however, the fine carbon fibers keep and maintain their individual isolatedly dispersed condition, because such surfactant molecules are interposed between the fine carbon fibers. Therefore, when the agglomerate of the present invention is again thrown into dispersion medium, the fine carbon fibers would be easily and uniformly dispersed throughout the system.

It is suitable that the additive amount of the cyclodextrin is 150-30% on a base of the total weight of the added fine carbon fibers, and it is suitable that the additive amount of the fullerene is 15-30% on a base of the total weight of the added fine carbon fibers.

(d) Dispersing Treatment

With respect to the carbon fiber dispersed liquid to be used in the present invention, since the fine carbon fibers are dispersed in an aqueous dispersion medium as the isolatedly dispersion by using the above mentioned dispersing agent and the fine carbon fiber may be naturally dispersed by dint of the dispersing agent, it is not particularly required to give a treatment such as stirring. For instance, however, supersonic treatment, and/or stirring treatment using various stirring devices may be applicable.

In particular, when as the carbon fibers the above mentioned carbon fibrous structures which each comprises carbon fibers each having an outside diameter of 1-100 nm, and a granular part with which the carbon fibers are bound in a state that the carbon fibers extend outwardly from the granular part are used, it is preferable to give a dispersion treatment of using a media mill, typically, for instance, a beadmill, in combination with the above mentioned dispersing agent, in order to obtain an excellent dispersibility.

Removal of Dispersion Medium from Fiber Dispersed Liquid

It only has to remove the dispersion medium from the fine carbon fiber dispersed liquid where the above mentioned fine carbon fibers are isolatedly dispersed by dint of the dispersing agent, in order to produce the redispersible agglomerate of fine carbon fibers according to the present invention. As drying method for the removal, any of freeze-drying, air-drying, and evaporation by heating such as oven-drying may be used. When the drying by heating is done, it would be possible to use the waste energy generated in the manufacturing process of fine carbon fibers, for instance.

Moreover, although the temperature of drying is not particularly limited, for instance, it may be in the range of about −197° C. to about 450° C., more preferably, about −197° C. to about 350° C. When the treatment is done at a temperature higher than this range, a possibility of the pyrolysis of dispersing agent would arise, and this pyrolysis of dispersing agent would induce the cohesion of the fine carbon fibers in the agglomerate of fine carbon fibers.

The agglomerate of fine carbon fibers according to the present invention is obtained by the removal of the dispersion medium from the fine carbon fiber. As for the shape of the agglomerate of fine carbon fibers, there is no particular limitation as long as the shape is the one that can give a good handling property and is convenience for using. For instance, any shapes such as various blocks, various pellets, various granules and so on, may be adaptable. Herein, in order to give a prescribed shape, it is preferable to make the carbon fiber dispersed liquid to take such a shape on the drying. For instance, the carbon fiber dispersed liquid would be stored into an appropriate shape of vessel in order to mold into block or pellets. Alternatively, the carbon fiber dispersed liquid would be atomized into droplets of a suitable size with an appropriate device such as an atomizer, and then the obtained droplets are freeze-dried in order to mold into granules.

Use of the Agglomerate of Fine Carbon Fibers

In the redispersible agglomerate of fine carbon fibers according to the present invention, the fine carbon fibers are gathered and solidified while the fine carbon fibers keep and maintain their individual isolated dispersibility. Therefore, a uniform dispersion system of the fine carbon fibers could be easily attained by simply adding a prescribe amount of the agglomerate into a dispersion medium which is intended to distribute the carbon fibers or a matrix material which is intended to complex the carbon fibers.

As this dispersion medium or matrix material, it is not limited to the one of the aqueous system that is used for preparing the redispersible agglomerate of fine carbon fibers according to the present invention. Even if it is an organic solvent or the like of non-aqueous system, the fine carbon fibers in the redispersible agglomerate can perform an excellent dispersibility. The reason is as follows. When the redispersible agglomerate of fine carbon fibers is added to an organic solvent of non-aqueous system or the like, the agglomerate would be allowed to take a course of disentanglement, since the fine carbon fibers in the agglomerate are isolatedly dispersed by dint of the dispersing agent. A phenomenon that the molecules of the dispersing agent which have enclosed the fine carbon fibers leave the fine carbon fibers during the disentanglement would be caused, since the molecules of the dispersing agent becomes harder to keep equilibrium system with the fine carbon fibers with the progression of disentanglement. However, as the replacement of the molecules of the dispersing agent, molecules of the organic solvent or the like would come to enter and occupy the position. Thus, thereafter, the cohesion of the fine carbon fibers would come to be obstructed by the molecules of the solvent or the like.

In the case that the agglomerate of fine carbon fibers according to the present invention is dispersed into a dispersion medium again in order to prepare a dispersion, although the concentration of the fine carbon fibers in the dispersion is not particularly limited, however, for instance, it is desirable to be in the range of about 0.01-90% from the viewpoint of forming a stable dispersion.

EXAMPLE

Hereinafter, the present invention will be illustrated in detail by practical examples. However, the present invention is not limited to the following examples.

Synthesis Example 1

Production of Fine Carbon Fibers

By the CVD process, fine carbon fibers were synthesized using a part of the exhaust gas from the generation furnace as a recycling gas in order to use as carbon source the carbon compounds such as methane, etc., included in the recycling gas, as well as a fresh toluene.

The synthesis was carried out in the presence of a mixture of ferrocene and thiophene as the catalyst, and under the reducing atmosphere of hydrogen gas. Toluene and the catalyst as a fresh raw material were heated to 380° C. along with the hydrogen gas in a preheat furnace, while a part of the exhaust gas taken out from the lower end of the generation furnace was used as a recycling gas. After the temperature of the recycling gas was adjusted to 380° C., it was mixed with the fresh raw material gas on the way of the supplying line for the fresh raw material to the generation furnace. The mixed gas was then supplied to the generation furnace.

The composition ratio in the recycling gas used were found to be $CH_4$ 7.5%, $C_6H_6$ 0.3%, $C_2H_2$ 0.7%, $C_2H_6$ 0.1%, CO 0.3%, $N_2$ 3.5%, and $H_2$ 87.6% by the volume based molar ratio. The mixing flow rate was adjusted so that the mixing molar ratio of methane and benzene in the raw material gas to be supplied to the generation furnace, $CH_4/C_6H_6$ was set to 3.44 (wherein, it was considered that the toluene in the fresh raw material gas had been decomposed at 100% to $CH_4$: $C_6H_6$=1:1 by the heating in the preheat furnace.).

In the final raw material gas, $C_2H_2$, $C_2H_6$, and CO which were involved in the recycling gas to be mixed were naturally included. However, since these ingredients were very small amount, they may substantially be ignored as the carbon source.

Then, they were underwent thermal decomposition at 1250° C. in order to obtain the carbon fibrous structures (first intermediate).

The raw material gas supplying rate to the generation furnace was set to 1850 NL/min., and the pressure was set to 1.03 atms.

Figure 2:
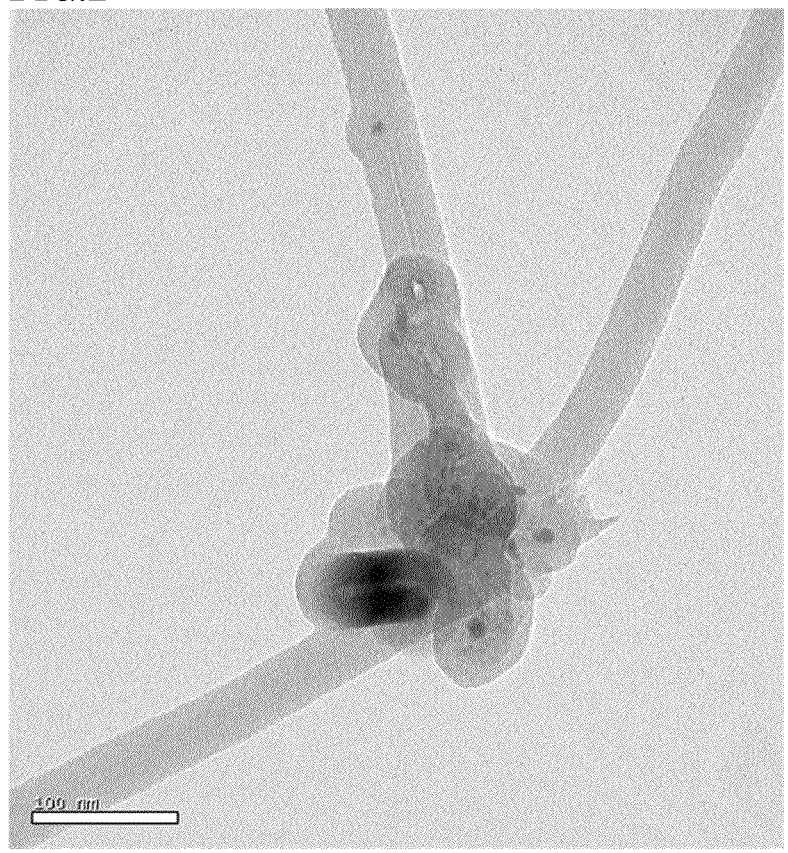
[FIG. 2] is a TEM photo of an intermediate for the carbon fibrous structure which was used to prepare the redispersible agglomerate of fine carbon fibers according to the present invention.

The synthesized first intermediate was baked at 900° C. in argon gas in order to remove hydrocarbons such as tar and to obtain a second intermediate. The R value of the second intermediate measured by the Raman spectroscopic analysis was found to be 0.83. Separately, sample for electron microscopes was prepared by dispersing the first intermediate into toluene. SEM photo and TEM photo obtained for the sample are shown in FIGS. 1 and 2, respectively.

Further, the second intermediate underwent a high temperature heat treatment at 2600° C. in argon gas. The obtained aggregates of the carbon fibrous structures underwent pulverization using an air flow pulverizer in order to produce carbon fibrous structures to be used for formation of dispersion film.

Figure 3:
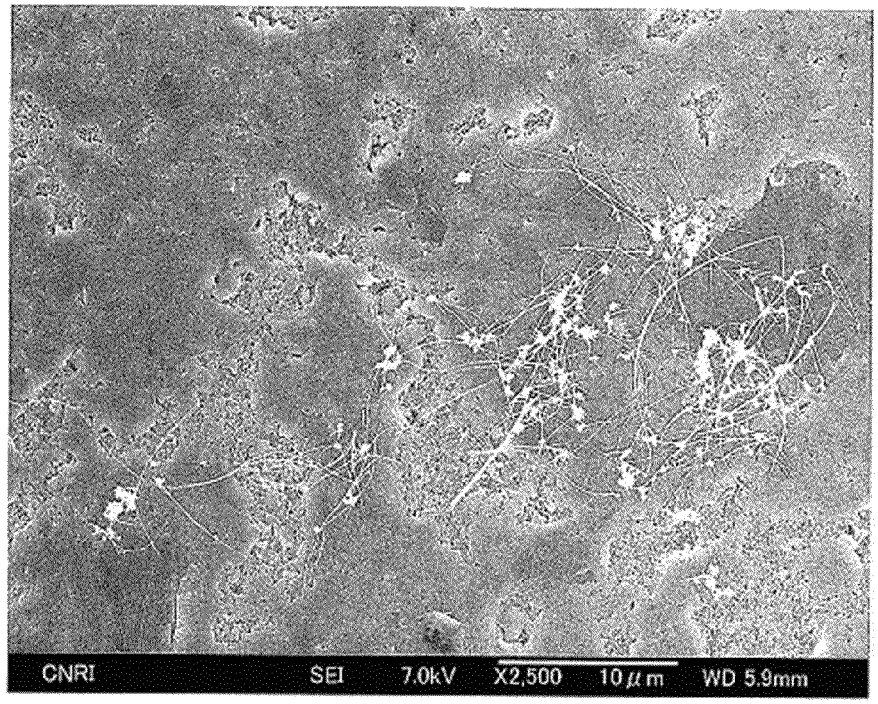
[FIG. 3] is a SEM photo of the carbon fibrous structure which was used to prepare the redispersible agglomerate of fine carbon fibers according to the present invention.
Figure 4A:
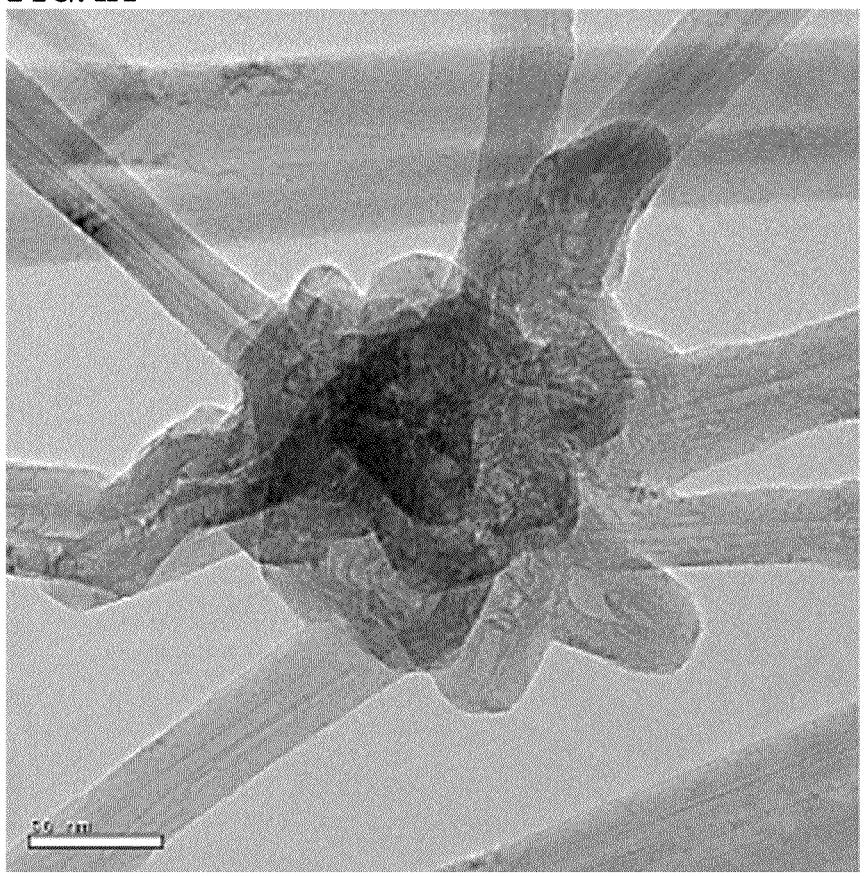
[FIG. 4A] and [FIG. 4B] are TEM photos of the carbon fibrous structure which was used to prepare the redispersible agglomerate of fine carbon fibers according to the present invention, respectively.
Figure 4B:
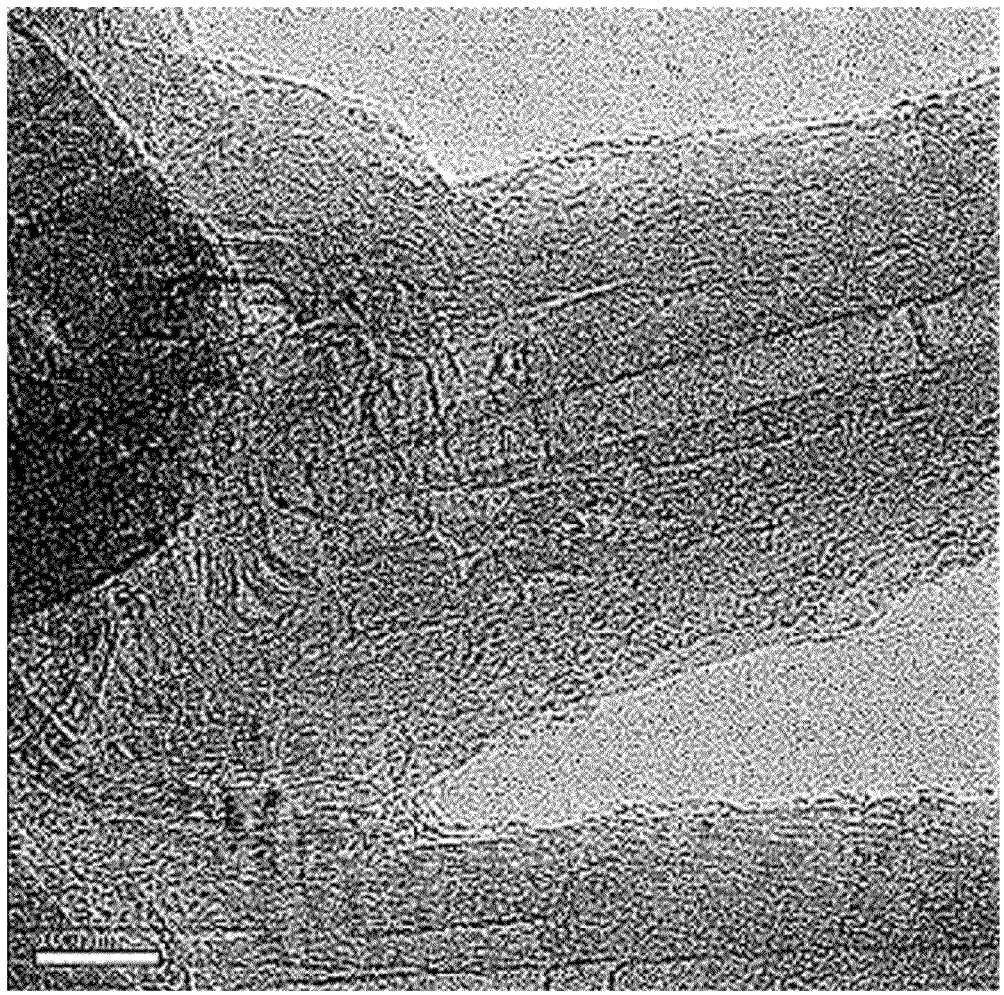

A sample for electron microscopes was prepared by dispersing ultrasonically the obtained carbon fibrous structures into toluene. SEM photo and TEM photos obtained for the sample are shown in FIGS. 3, 4A and 4B, respectively.

Separately, the obtained carbon fibrous structures, as-is, were mounted on a sample holder for electron microscope, and observed for the particle distribution. The obtained results are shown in Table 1.

Additionally, it was found that the carbon fibrous structures had an area based circle-equivalent mean diameter of 75.8 µm, bulk density of 0.004 g/cm³, Raman $I_D/I_G$ ratio of 0.086, TG combustion temperature of 807° C., spacing of 3.386 A, particle's resistance of 0.0077 Ω·cm, and density after decompression of 0.26 g/cm³. Table 1 provides a summary of the various physical properties as determined in Synthetic Example 1.

TABLE 1

| Particle Distribution (pieces) | Synthetic Example |
|---|---|
| <50 µm | 48 |
| 50 µm to <60 µm | 39 |
| 60 µm to <70 µm | 33 |
| 70 µm to <80 µm | 30 |
| 80 µm to <90 µm | 12 |
| 90 µm to <100 µm | 15 |
| 100 µm to <110 µm | 3 |
| ≧110 µm | 18 |
| Area based circle-equivalent mean diameter | 75.8 µm |

TABLE 2

| | Synthetic Example |
|---|---|
| Area based circle-equivalent mean diameter | 75.8 µm |
| Bulk density | 0.004 g/cm³ |
| $I_D/I_G$ ratio | 0.086 |
| TG combustion temperature | 807° C. |
| Spacing for (002) faces | 3.386 A |
| Particle's resistance, at 0.5 g/cm³ | 0.0161 Ω·cm |
| Particle's resistance, at 0.8 g/cm³ | 0.0089 Ω·cm |
| Particle's resistance, at 0.9 g/cm³ | 0.0077 Ω·cm |
| Density after decompression | 0.26 g/cm³ |

Synthesis Example 2

Preparation of Carbon Nanotube Dispersed Liquid

To one liter of purified water, 1.9 grams of 3-(N,N-dimethyl stearyl ammonio)-propane sulfonate and 0.1 grams of dodecylsulfate salt were added, in order to prepare a mixed micelle solution.

To one liter of this mixed micelle solution, 20 grams of the carbon fibrous structures obtained by Synthesis Example 1 is added. After sufficient mixing, the resultant mixture underwent a dispersing treatment of using a bead mill (Product name: DYNO-MILL, made in Switzerland; the kind of beads: zirconium (mean diameter: 0.32 nm) for 180 minutes. As a result, a colloid wherein the individual fine carbon fibers were perfectly isolatedly dispersed in the aqueous solution (hereinafter the colloid is referred to as "nanocarbon sol") was obtained. It was found that the colloidal size were not more than 500 nm as a mean diameter, when determined by using a particle size distribution analyzer (Microtrac, NIKKISO CO., LTD., Japan)

For the reference, this dispersed liquid was coated on a glass substrate by a prescribed coating amount (10 mg/m², on a dry weight basis), and it air-dried for two minutes at 80° C. After the state that the surface of the coated and developed film was dried up was obtained, a polymer solution (the kind of resin: phenol, concentration: 5%, solvent: methanol) was coated onto the film by a prescribed coating amount (400 mg/m², on a dry weight basis) using a similarly spin-coating procedure, and then it underwent heated-drying at 380° C. for 10 minutes in order to obtain a fine carbon fiber dispersion film. It was found that the surface resistivity of this film was 18 Ω/□.

Example 1

Manufacturing of Agglomerate of Fine Carbon Fibers

The carbon nanotubes dispersed liquid obtained by Synthesis example 2 was poured into a cell and then heated up to 80° C. in order to remove the moisture from the carbon nanotubes. Thus, an agglomerate of fine carbon fibers in the shape of block having a size of 15 cm in diameter×10 cm in thickness was obtained. This agglomerate had a strength of not breaking easily manually, and thus the handling property was sufficient.

Further, it was determined that the content of the fine carbon fibers in the agglomerate was 90% by weight, and the content of the dispersing agent was 10% by weight, and the moisture content was calculated as it was less than 1% by weight.

Figure 5:
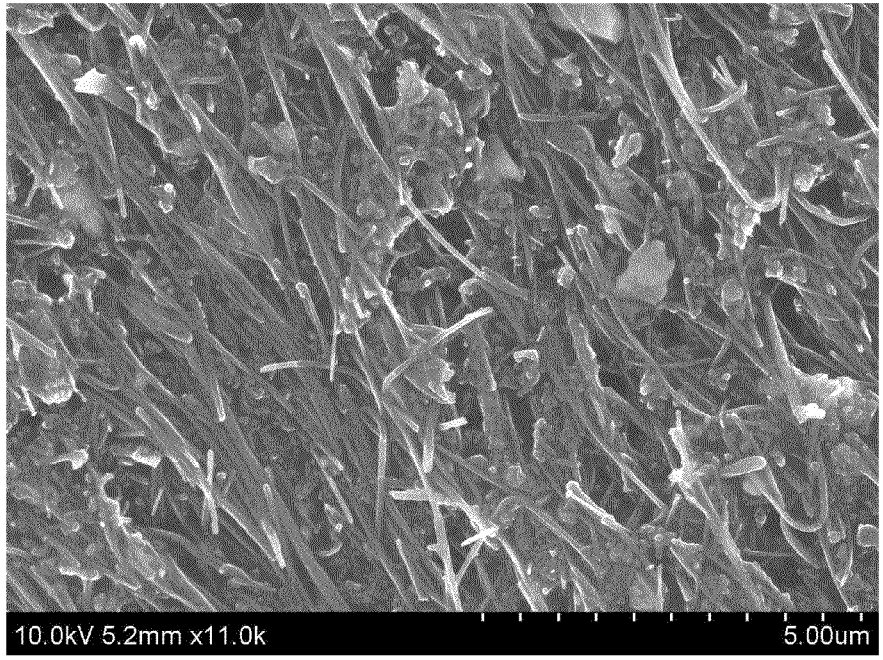
[FIG. 5] is a SEM photo where the dispersion state of carbon fibers in the redispersible agglomerate of fine carbon fibers according to the present invention is shown.
Figure 6:
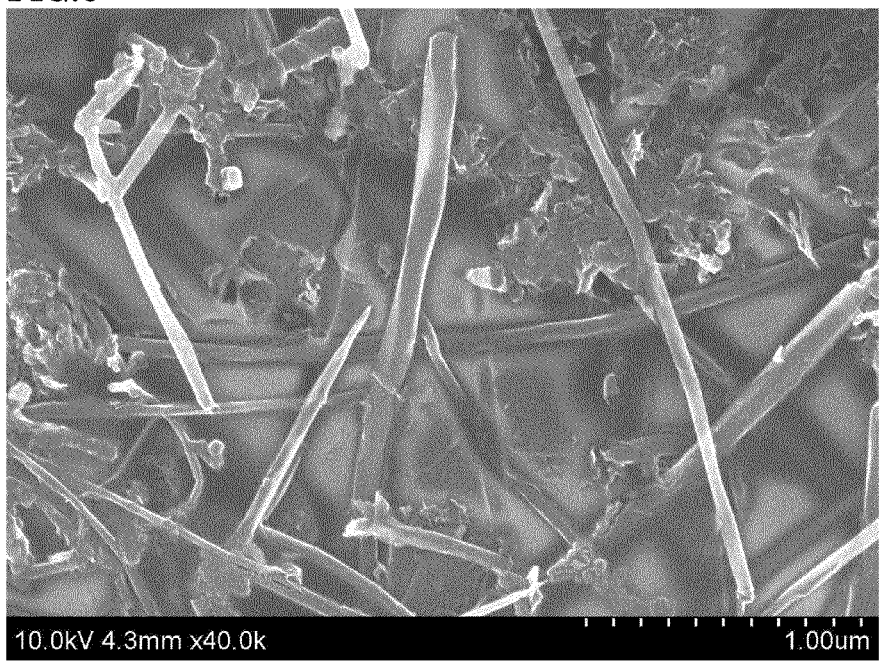
[FIG. 6] is a SEM photo where the dispersion state of carbon fibers in a film is shown, which film was obtained by using the redispersible agglomerate of fine carbon fibers according the present invention and thereby redispersing the fine carbon fibers into a medium.

FIG. 5 shows the result of observing the dispersion state of fine carbon fiber in this agglomerate by using SEM.

Example 2

Manufacturing of Agglomerate of Fine Carbon Fibers

The carbon nanotube dispersed liquid obtained by Synthesis example 2 were atomized by using an atomizer, and then the atomized droplets underwent heat-drying or freeze-drying in order to remove the moisture therefrom. Thus, agglomerates of fine carbon fibers in the shape of granules having a mean diameter of 3 μm. These agglomerates in granule shape also shown a good handling property.

Example 3

Use of Agglomerate of Fine Carbon Fibers

From the agglomerate of fine carbon fibers in the shape of block obtained by Example 1, a piece of a prescribed size was cut out so that the piece included an amount of fine carbon fibers equivalent to the amount included in the dispersed liquid obtained by Synthesis example 1, and the obtained piece was added to one liter of purified water. Then, the mixture was heated from the room temperature to 60° C. in a hot water bath, and was left to stand for about 10 minutes. As a result, the individual fine carbon fibers dissociated from the piece were completely dispersed (solved) in the aqueous solution. Since it was possible to disperse the fine carbon fibers uniformly within a short period and without applying any mechanical stirring procedure, it was found that the uniform dispersion system was prepared more easily by using the agglomerate of fine carbon fibers according to the present invention, as compared with the cases that a dispersion system of a similar composition was prepared by using directly the fine carbon fiber, per se, and the dispersing agent.

For the reference, a fine carbon fiber dispersion film was formed in accordance with the same procedure disclosed in Synthesis example 2 except that thus obtained re-dispersed liquid was used, and then the surface resistivity of the obtained film was determined. As a result, it was found that the surface resistivity of this film was 21 Ω/□, which was about the same electroconductivity level with the data in the case that the original dispersed liquid was used. Moreover, when dispersion state of the fine carbon fibers in the obtained film was observed by using TEM (See, FIG. 5), an excellent dispersibility similar to the one in the film showed in Synthesis example 2 was observed. Therefore, it was found that it was possible to reproduce the uniform dispersibility as observed in the original dispersed liquid, when a dispersed liquid was prepared again by using the agglomerate of fine carbon fibers according to the present invention.

The invention claimed is:

1. An agglomerate of redispersible fine carbon fibers, which is characterized in that it is obtained by adding the fine carbon fibers and a dispersing agent which shows solid state at least at ordinary temperature (20±10° C.) into an aqueous dispersion medium, and then removing the dispersion medium from a dispersion system where the carbon fibers are isolated individually and dispersed in the dispersion medium; and that the carbon fibers are collected and solidified to form the agglomerate while each carbon fiber maintains its isolated dispersibility;

wherein the carbon fiber content is in the range of 0.01-99.5% by weight, the dispersing agent content is in the range of 0.1-99.5% by weight, and the moisture content is in the range of less than 10% by weight, based on the total weight of the agglomerate; and wherein the dispersing agent is one member selected from the group consisting of (1) surfactants capable of forming spheroidal, cylindrical, or tabular micelles of 50-2000 nm in diameter in an aqueous solution; (2) water-soluble high polymers having a weight average molecular weight in the range of 10,000-50,000,000; and (3) a combination of cyclodextrin and fullerene;

wherein the individual fine carbon fiber in the agglomerate is dispersed in its isolated form when the agglomerate is added to a dispersion medium.

2. The agglomerate of redispersible fine carbon fibers according to claim 1, wherein the redispersible agglomerate of fine carbon fibers is formed into a block or granules.

3. The agglomerate of redispersible fine carbon fibers according to claim 1, wherein each fine carbon fiber comprises tubular graphene sheets layered in a direction orthogonal to the axis of the fine carbon fiber, wherein the tubular graphene sheets include polygonal cross sections in a direction orthogonal to the axis of the fine carbon fiber, wherein a maximum diameter of the cross sections is in the range of 15 to 100 nm, an aspect ratio of the fine carbon fiber is not more than $10^5$, and $I_D/I_G$ of the fine carbon fiber as determined by Raman spectroscopy at 514 nm is not more than 0.1.

4. The agglomerate of redispersible fine carbon fibers according to claim 1, wherein carbon fibrous structures are used as the fine carbon fibers, each carbon fibrous structure comprising a three dimensional network of carbon fibers, said carbon fibers each having an outside diameter of 1-100 nm, said carbon fibrous structure further comprising a granular part with which said carbon fibers are bound in a state that said carbon fibers extend outwardly from the granular part, and the granular part being produced in a growth process of the carbon fibers; and, wherein the dispersion system where individual carbon fibrous structures comprising the three dimensional network of carbon fibers are isolated individually and dispersed in the dispersion medium is formed by dispersing the carbon fibrous structures in the dispersion medium using a media mill.

5. A method for manufacturing agglomerate of redispersible fine carbon fibers, wherein the carbon fibers are collected and solidified to form the agglomerate while each carbon fiber maintains its isolated dispersibility, which method comprises adding (A) the fine carbon fibers and (B) a dispersing agent into an aqueous dispersion medium, wherein the dispersing agent is one member selected from the group consisting of (1) surfactants capable of forming spheroidal, cylindrical, or tabular micelles of 50-2000 nm in diameter in an aqueous solution, (2) water-soluble high polymers having a weight average molecular weight in the range of 10,000-50,000,000, and (3) a combination of cyclodextrin and fullerene;

isolating the carbon fibers individually and dispersing them in the dispersion medium to form a dispersion system; and then removing the dispersion medium from the dispersion system;

wherein the individual fine carbon fiber in the agglomerate disperse in its isolated form when the agglomerate is added to a dispersion medium.

6. The method for manufacturing agglomerate of redispersible fine carbon fibers according to claim 5, wherein the dispersion medium is removed from a dispersion system at a temperature in the range of −197° C. to 450° C.

* * * * *